(12) United States Patent
Gopalakrishnan et al.

(10) Patent No.: US 7,333,457 B2
(45) Date of Patent: Feb. 19, 2008

(54) HIGH SPEED DEDICATED PHYSICAL CONTROL CHANNEL FOR USE IN WIRELESS DATA TRANSMISSIONS FROM MOBILE DEVICES

(75) Inventors: Nandu Gopalakrishnan, Chatham, NJ (US); Jung-Tao Liu, Randolph, NJ (US); Wenfeng Zhang, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1038 days.

(21) Appl. No.: 10/289,100

(22) Filed: Nov. 6, 2002

(65) Prior Publication Data

US 2004/0085936 A1     May 6, 2004

(51) Int. Cl.
*H04Q 7/24* (2006.01)
(52) U.S. Cl. ...................................... 370/335; 370/328
(58) Field of Classification Search ...................... None
See application file for complete search history.

(56) References Cited

U.S. PATENT DOCUMENTS

2004/0116143 A1* 6/2004 Love et al. .................. 455/522
2005/0141446 A1* 6/2005 Niwano ....................... 370/328

FOREIGN PATENT DOCUMENTS

EP   1 248 485 A1   10/2002

OTHER PUBLICATIONS

ETSI: "Universal Mobile Telecommunications System (UMTS); Physical channels and mapping of transport channels onto physical channels (FDD)"; ETSI TS 125 211 V3.1.1 (Jan. 2000).
Lucent Technologies: TSG-RAN Working Group 1, Stockholm, Sweden, November 21-24 Text Proposal for the HSDPA Technical Report; XP-002175651; TSGR1#17(00)1384.
Motorola: TSG-RAN Working Group 1 meeting #16, Pusan, Korea, Oct. 10-Oct. 13, 2000; Control Channel Structure for High Speed DSCH (HS-DSCH); XP-002206394; TSGR1#16(00)1242.
European Search Report mailed Dec. 23, 2003.

* cited by examiner

*Primary Examiner*—Erika A. Gary

(57) ABSTRACT

A wireless data communication system includes a high speed dedicated physical control channel (EU-DPCCH) used with transmissions from a mobile device to support an uplink high speed data channel. In one example the EU-DPCCH has a sub frame structure that is the same as an associated dedicated data channel and a fixed spreading factor. The EU-DPCCH allows communicating control information from the mobile device such as a pilot reference, hybrid automatic repeat request information, and backlog information regarding a buffer of the mobile device.

12 Claims, 3 Drawing Sheets

__US 7,333,457 B2__

HIGH SPEED DEDICATED PHYSICAL CONTROL CHANNEL FOR USE IN WIRELESS DATA TRANSMISSIONS FROM MOBILE DEVICES

BACKGROUND OF THE INVENTION

1. Field of the Invention

This invention generally relates to wireless communication systems and more particularly to wireless systems for transmitting data from mobile devices.

2. Description of the Related Art

Communication systems such as wireless systems are designed to meet various demands of subscribers. Service providers continuously seek ways to improve the overall performance of the communication system. As wireless communications become more and more popular for subscribers to obtain data (i.e., email or information from the internet), communication systems must be capable of a higher throughput.

There are two directions of data flow in such systems. Communications from a base station to a mobile device are considered to flow in a downlink direction while the communications originating at the mobile device are considered to flow in an uplink direction. Most of the work in this area has focused on the downlink flow of information, which is to the mobile devices (typically from a base station).

Wireless third generation (3G) communication systems are currently introducing technologies in order to become spectrally efficient, while supporting data services, and in order to provide improved multiplexing voice and multiplexing data services. These efforts have resulted in the development of the 3Gx-EVDV standard, an evolution of the CDMA2000 standard from the 3GPP2 body of standards. Similarly, the Universal Mobile Telecommunication System (UMTS) standard has introduced several advanced technologies as part of the High Speed Downlink Packet Access (HSDPA) specification. An aspect in all of these enabling technologies is to ensure that any associated control information is carried in an efficient manner.

Certain advanced or enabling technologies may include scheduling. Adaptive Modulation and Coding (AMC) and Hybrid Automatic Repeat Request (HARQ) technologies. These technologies have been introduced in an effort to improve overall system capacity. In general, a scheduler, such as is present at a base station (called Node-B in UMTS) selects a user for transmission at a given time, and adaptive modulation and coding allows selection of the appropriate transport format (modulation and coding) for the current channel conditions seen by the user. Accordingly, in scheduling, the Node B grants permission to one or more users at a time, rather than to allow data users to transmit autonomously. Typically, this is based on an estimate of each user's link quality in one of the downlink and uplink.

AMC technologies enable a selection of a data rate and a transmission format (i.e., modulation level and channel coding rate) that best "suits" the scheduled user's prevailing channel condition. Delays and measurement errors result in degraded performance from AMC. So, suppose a block of bits or a packet was sent out using QPSK modulation and a code rate of 0.5 and was received erroneously. A retransmission of that packet takes place, in general with a new appropriate choice of modulation and in general, at least a few new "parity" bits from the original set of coded b its.

HARQ allows combining the original transmission. This greatly improves the probability of correct decoding of the packet. The word "hybrid" in HARQ indicates that Forward Error Correction (FEC) techniques have been used in addition to ARQ techniques. HARQ combining schemes imply that retransmissions are combined with the original unsuccessful transmissions. Accordingly, HARQ helps to ensure that transmissions resulting in unsuccessful decoding, by themselves, are not wasted. Lucent Technologies, Inc.'s Adaptive Asynchronous Incremental Redundancy ($A^2IR$) approach, which is a form of HARQ combining, has been adopted in both the 3G1x-EVDV and HSDPA specifications. $A^2IR$ is a flexible approach and allows HARQ combining of copies that use potentially different modulation schemes.

While much of the standardization to date has focused on the downlink (from base station (Node B)) to mobile station, similar enhancements are now being considered for the uplink. The enabling technologies discussed above are also available to enhance the uplink, but the relative importance of these technologies, and the specific methodology for each, may be quite different as related to the uplink. These differences may be due, for example, to different tradeoffs being applicable on the uplink, as compared to the downlink.

The current proposal for uplink data signal format and content does not address all needs for control information in the uplink data transmission. This invention addresses that need by including a new control channel or code in a data signal transmission from a mobile device.

SUMMARY OF THE INVENTION

In general terms, this invention is a wireless data communication method that includes transmitting control information over a high speed dedicated control channel as part of a data signal transmission from a mobile communication device to support the uplink high speed data operation.

In one example the uplink dedicated control channel has a sub frame structure that is the same as at least one other dedicated channel of the data signal. In one example the dedicated control channel has a fixed spreading factor. In one particular example, the dedicated control channel has the same sub frame transmission time as an associated dedicated physical data channel (DPDCH) transmission time. The spreading factor in such an example may be selected to be different from that of the associated DPDCH.

An example of the inventive dedicated control channel includes data indicative of at least a pilot reference, hybrid automatic repeat request information, and mobile device buffer backlog information.

The various features and advantages of this invention will become apparent to those skilled in the art from the following detailed description. The drawings that accompany the detailed description can be briefly described as follows.

DETAILED DESCRIPTION

This invention includes transmitting a high speed dedicated physical control channel (referred to as EU-DPCCH) as part of an uplink data transmission from a mobile communication device to support the uplink high speed data operation. The EU-DPCCH allows the mobile unit to provide control information that was previously not available to the controller at the base station that controls high speed data communications.

Figure 1:
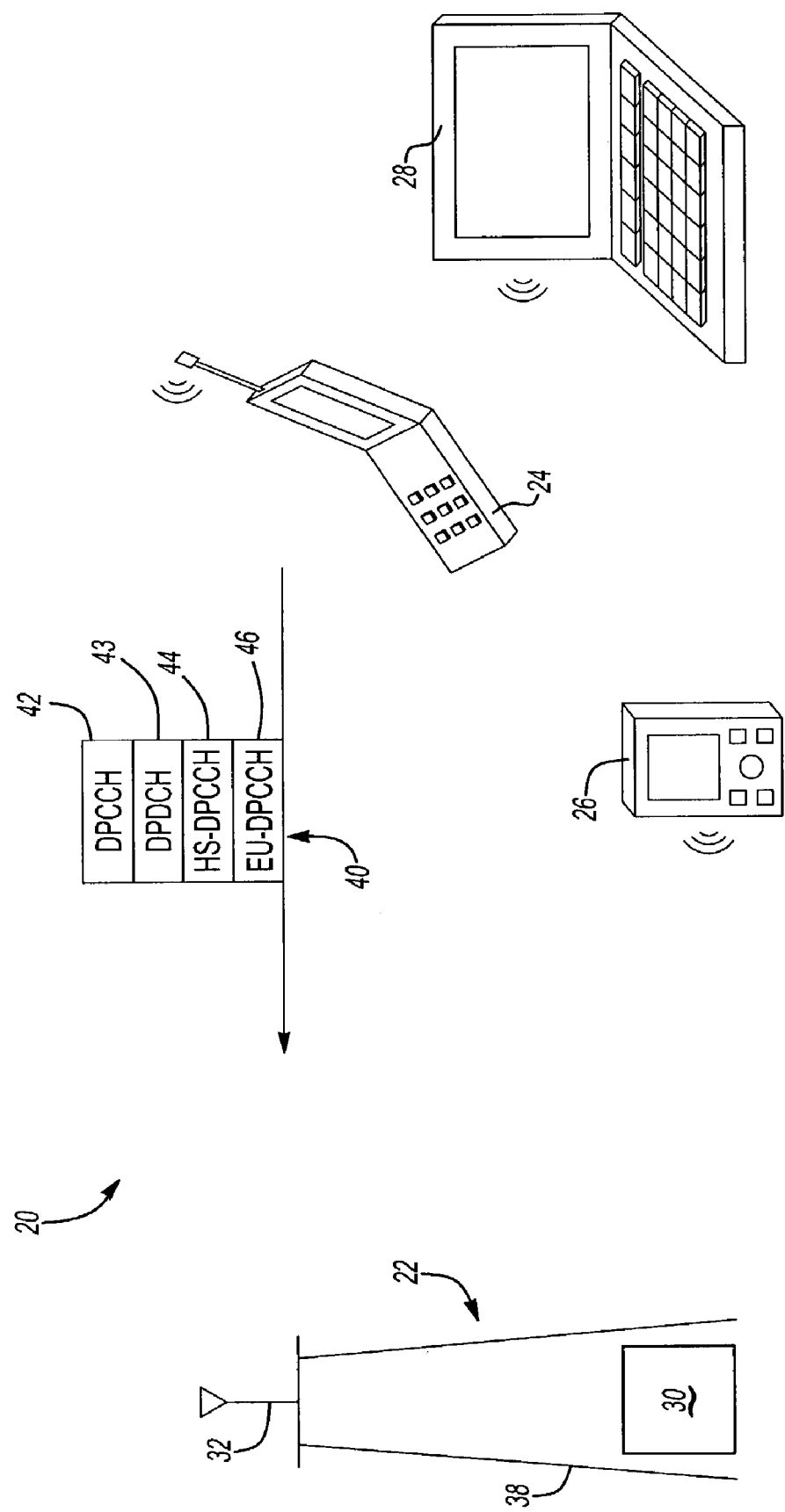
FIG. 1 schematically illustrates selected portions of a wireless data communication system incorporating control channel transmission techniques designed according to this invention.

FIG. 1 schematically illustrates a wireless data communication system 20 including a base station 22 and a plurality of mobile devices 24, 26 and 28. The mobile devices are any of a variety of commercially available communication devices that are capable of receiving data information through a wireless communication interface such as a cell phone 24, a personal digital assistant 26 or a notebook computer 28. Of course, this invention is not limited to any particular mobile device. The illustrated examples are provided to show different types of user devices that may be used in a system designed according to this invention.

The base station 22 includes a system controller 30 that includes known radio equipment and signal processing equipment that is useful for generating and processing data and communication signals in a wireless network. The controller 30, for example, includes the necessary electronics and software for deciphering and managing signals received by the example antenna 32 and for generating or transmitting the signals necessary to achieve the communications desired at the mobile devices within the network.

FIG. 1 schematically shows an uplink data signal 40 sent from the mobile device 24 to the base station 22. Transmitting the data signal 40 includes transmitting control information over several control channels or codes. "Control channel" as used in this description is a term understood in the art and should be considered synonymous or interchangeable with "control code." A first control channel 42 is a dedicated physical control channel (DPCCH). A second control channel 43 is a dedicated physical data channel (DPDCH). Another control channel 44 is a high speed dedicated physical control channel (HS-DPCCH), which is the control channel on the uplink used to support the high speed downlink shared data channel, otherwise known as HS-DSCH. This invention includes a high speed dedicated physical control channel (EU-DPCCH) 46 to support the high speed data operations on the uplink.

The EU-DPCCH 46 includes or carries at least one selected control parameter or indicator. In one example, at least a pilot reference, hybrid automatic repeat request (HARQ) request information, and mobile device buffer backlog information are included in one or more EU-DPCCHs 46. The pilot reference provides information regarding the current transmission power used by the mobile device, for example, and otherwise facilitates communication between the mobile device and the base station 22 in a conventional manner. The hybrid automatic repeat request information provides information to the base station regarding the process to which the transmitted data belongs, for example. In one example, a hybrid automatic repeat state and an acknowledgment are included in the EU-DPCCH 46. The mobile device buffer backlog information provides an indication of the amount of data currently backed up on the mobile device buffer so that the base station scheduler can make an appropriate priority assignment, for example. The inventive EU-DPCCH 46 may include other control information as needed in a particular situation.

The EU-DPCCH 46 has at least one characteristic that allows it to be standardized. The EU-DPCCH 46 has a sub frame structure that is the same as at least one other dedicated channel of the data signal transmission. In one example, the EU-DPCCH 46 uses the sub frame structure of the multi code high speed DPDCH 43. For example, where the uplink DPDCH 43 uses one, three or five time slots as the sub frame structure, then the EU-DPCCH 46 shall use one, three or five time slots, respectively, to carry the control information over the EU-DPCCH 46.

Another way of expressing the sub frame structure relationship between the EU-CPDDH 46 and the selected associated channel is to say that the EU-DPCCH 46 has a transmission time interval that is the same as at least one of the other channels 42, 43, or 44. In one example the EU-DPCCH 46 has a transmission time interval that is the same as the transmission time interval of the DPDCH 43. The EU-DPCCH sub frame structure occupies less than 15 time slots (i.e., less than a complete frame). In one example the EU-DPCCH 46 occupies three time slots and has a transmission time interval of 2 milliseconds. Given the needs of a particular situation, those skilled in the art who have the benefit of this description will be able to select an appropriate sub frame structure to meet the needs of a particular situation. In one example, the base station uses known techniques such as a scheduling algorithm to instruct the mobile device or devices how to configure the EU-DPCCH 46 for a particular communication.

The EU-DPCCH 46 in one example also has a spreading factor that remains fixed. The spreading factor selected for the EU-DPCCH 46 may be different than the spreading factor of the HS-DPCCH 44, DPCCH 42, or the associated uplink high speed data channel.

Figure 2:
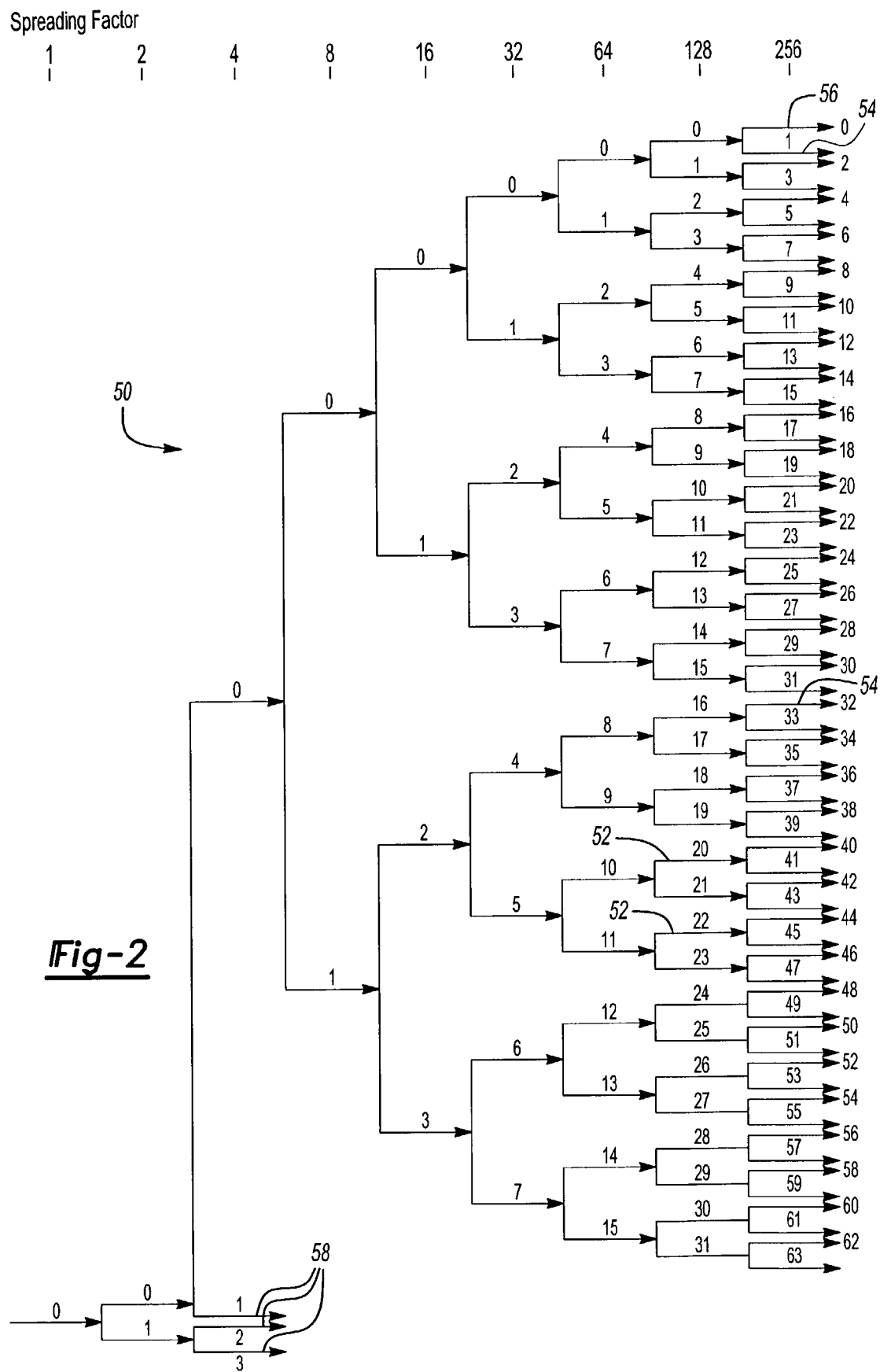
FIG. 2 schematically illustrates example control channel characteristics in an example implementation of this invention.

FIG. 2 illustrates an example code tree or control channel tree 50 that shows channelization code usage according to known standards. The inventive arrangement includes the EU-DPCCH 46 at a spreading factor within the tree 50 at a selected level that remains fixed. In the illustrated example, the EU-DPCCH 46 has a spreading factor of 128 and is allocated to the channelization codes at 52. In this example the HS-DPCCH control channel 44 is allocated to the channelization codes at 54, the DPCCH 42 is shown at 56 and the DPDCH 43 is shown at 58.

The EU-DPCCH 46 may be set with a different spreading factor and at different ones of the available channelization codes within the example code tree 50.

Figure 3:
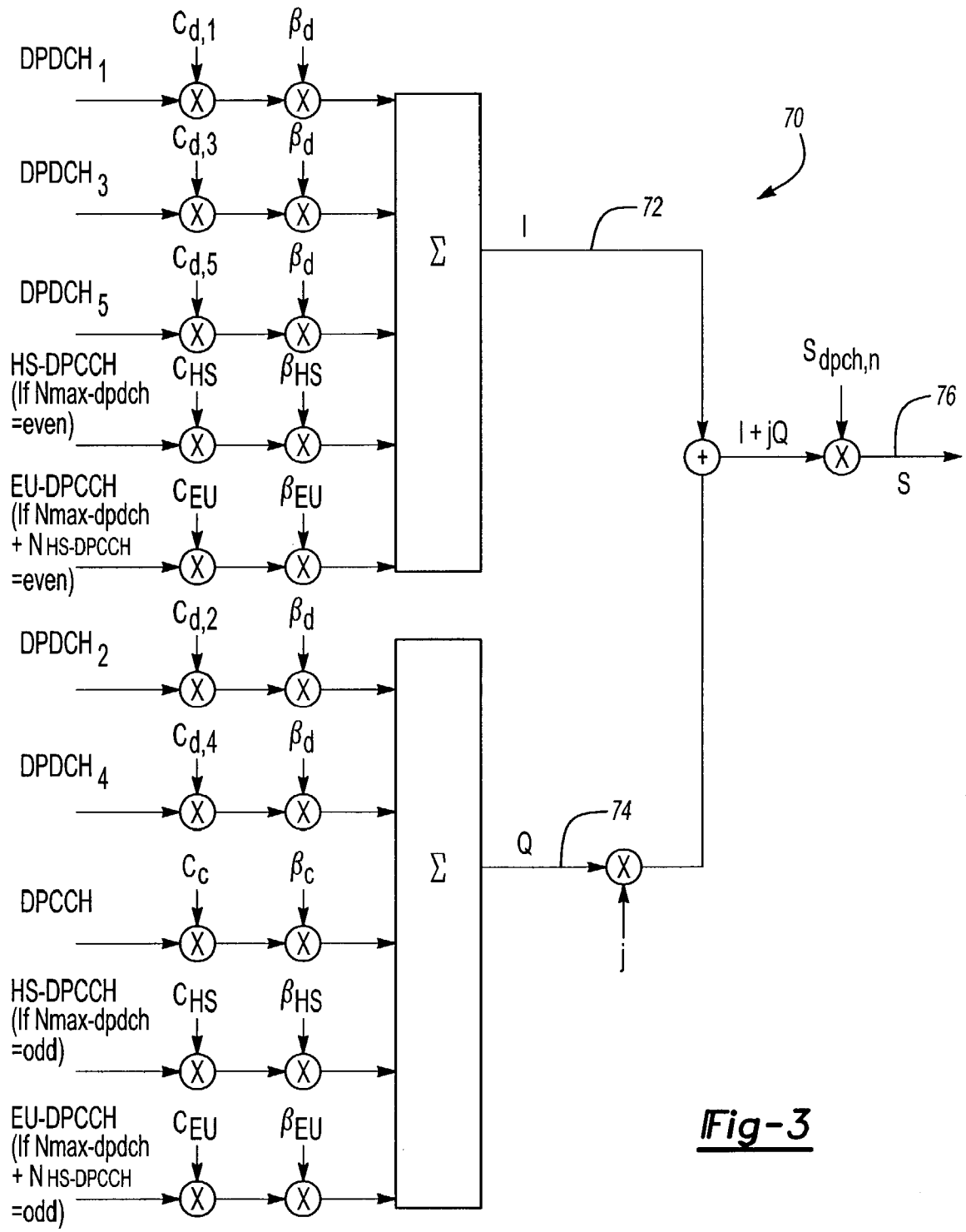
FIG. 3 schematically illustrates a multiplexing scheme useful with a method that incorporates a dedicated control channel according to this invention.

In one example, the dedicated channel on the uplink carries three types of physical channels including the DPCCH 42, the DPDCH 43 and the HS-DPCCH 44. In this example, the DPCCH 42 contains PILOT information, transport format combination indicator, feedback information and transmission power control. The HS-DPCCH 44 contains HARQ-ACK/NACK and a channel quality indicator (CQI). The three channels 42, 43 and 44 are I/Q code multiplexed. The DPCCH 42 uses a slot structure with fifteen slots over ten milliseconds with a fixed spreading factor of 256. The HS-DPCCH 44 uses a sub frame structure over two milliseconds with a fixed spreading factor of 256. The DPDCH 43 uses a variable spreading factor and has a maximum data rate of 2.8 Mbps when using a spreading factor of four with six parallel codes. An example strategy for multiplexing the physical channels is shown in FIG. 3 and described below.

The channelization code allocation for this example dedicated channel on the uplink has several characteristics. The DPCCH 42 is always spread by the code $c_c=C_{ch, 256,0}$. The HS-DPCCH 44 is spread by code $C_{ch}$ as described in the following table:

Channelization code of HS-DPCCH

| Nmax-dpdch (as defined in subclause 4.2.1) | Channelization code $C_{ch}$ |
|---|---|
| 1 | $C_{ch,256,64}$ |
| 2, 4, 6 | $C_{ch,256,1}$ |
| 3, 5 | $C_{ch,256,32}$ |

When only one DPDCH 43 is to be transmitted, the DPDCH$_1$ is spread by code $c_{d,1}=C_{ch,SF,k}$ where SF is the spreading factor of DPDCH$_1$ and K=SF/4. When more than one DPDCH 43 is to be transmitted, all DPDCH$_n$ have spreading factors equal to four. DPDCH$_n$ is spread by the code $c_{d,n}=C_{ch,4,k}$ where K=1 if n $\epsilon\{1, 2\}$, k=3 if n $\epsilon\{3, 4\}$, and k=2 if n $\epsilon\{5, 6\}$.

In one example, where a power control preamble is used to initialize a DCH, the channelization code for the DPCCH 42 during the power control preamble is the same as that which is used afterward.

In one example, the EU-DPCCH 46 uses the sub frame structure of the multicode high speed DPDCH 43. For example, where the uplink DPDCH 43 uses one, three or five time slots as sub frame structures, then the EU-DPCCH shall use either one, three or five time slots to carry the control information within the EU-DPCCH.

In one example, a maximum of six multicodes with a spreading factor of four is used to transmit the dedicated physical data channels. The actual number of codes selected shall depend on the channel condition and the scheduled UE buffer size. The remaining channelization codes are used for DPCCHs. With current channelization code allocation, a fixed spreading factor for the uplink high speed dedicated physical control channels of either 16, 32, 64, 128 or 256 may be selected depending on the error rate requirement.

One example implementation of this invention includes multiplexing the control channels on I/Q channels. FIG. 3 schematically shows a multiplexing scheme 70 for distributing the control channels between an I channel 72 and a Q channel 74. The portions of the data signal on the I/Q channels are summed and multiplied to obtain the transmitted signal at 76. I/Q channels and the technique to obtain the signal at 76 are known.

According to one example, the load of the control channels or codes on the I/Q channels is balanced as much as possible. One way of achieving at least an approximate balance is to select the I or Q channel to carry the EU-DPCCH 46 based upon the current other channel conditions and the corresponding load carried on the I and Q channels, respectively. In the illustrated example, when there are an even number of DPCCH channels or codes 42, then the HS-DPCCH 44 and the EU-DPCCH 46 are carried on the I channel 72. When there are an odd number of DPCCH channels or codes 42, then the HS-DPCCH 44 and the EU-DPCCH 46 are carried on the Q channel 74. In FIG. 3, $N_{HS-DPCCH}$ is the number of HS-DPCCH channel in the system and $N_{MAX-dpdch}$ is the maximum number of DPDCH channel in the system. Of course, a variety of multiplexing schemes are within the scope of this invention.

The inventive uplink dedicated physical control channels support new enhancements on uplink dedicated channels that avoid modifications to existing uplink dedicated physical control channels and avoid backward compatibility problems. The inventive arrangement also avoids introducing any unnecessary latency by allowing simultaneous transmission of the EU-DPCCH 46, DPCCH 42, DPDCH 43 and HS-DPCCH 44 (i.e., HS-DPCCH for HSDPA and DPCCH for Rel-99). The inventive approach ensures the overall integrity of the standard dedicated channel structure yet allows for improved transmission of more control information. The inventive approach also provides a fixed spreading code with the flexibility of choosing from a wide range of spreading factors to meet the Eb/No requirement without necessarily introducing further complex channel coding. Accordingly, this invention provides enhanced features and minimizes the associated complexity.

While the particular invention has been described with reference to illustrative embodiments, this description is not to be construed in a limiting sense. Consequently, the method, system and portions thereof and of the described method and system may be implemented in different locations, such as network elements, the wireless unit, the base station, a base station controller, a mobile switching center and/or a radar system. Additionally, those skilled in the art who have the benefit of this description will realize that control or processing circuitry for implementing and using the this invention may be implemented in application-specific integrated circuitry, software-driven processing circuitry, firmware, programmable logic devices, hardware, discrete components or combinations of these. Those skilled in the art may recognize that various modifications can be made to the exemplary applications illustrated and described above without departing from the spirit and scope of the present invention. It is therefore to be understood that the appended claims will cover any such modifications or embodiments as fall within the true scope of the invention.

We claim:

1. A method of wireless communication, comprising:
   using a dedicated physical data channel as an uplink high speed data channel for transmitting a data signal having a sub frame structure comprising a number of time slots; and
   transmitting control information over a high speed dedicated control channel for supporting high speed data packet access on the uplink high speed data channel.

2. The method of claim 1, wherein the control information has the same sub frame structure as the data signal.

3. The method of claim 1, wherein the control information occupies a number of time slots that is the same as a number of time slots occupied by data transmitted over a dedicated data channel that is part of the data signal.

4. The method of claim 1, wherein the dedicated control channel has a fixed spreading factor.

5. The method of claim 1, including transmitting control information over at least one dedicated physical control channel, at least one dedicated physical data channel and a high speed dedicated physical control channel associated with a high speed downlink shared data channel in the downlink direction, and including multiplexing the channels by allocating the channels between an I and a Q channel such that a load on the I channel is approximately balanced with a load on the Q channel.

6. The method of claim 1, wherein the control information transmitted over the high speed dedicated control channel includes at least a pilot reference, hybrid automatic repeat request information, and mobile device buffer backlog information.

7. A method of wireless communication, comprising:
using a dedicated physical data channel as an uplink high speed data channel for receiving a data signal having a sub frame structure comprising a number of time slots; and
receiving control information over a high sneed dedicated control channel for supporting high speed data packet access on the uplink high speed data channel.

8. The method of claim 7, wherein the control information has the same sub frame structure as the data signal.

9. The method of claim 7, wherein the control information occupies a number of time slots that is the same as a number of time slots occupied by data received over a dedicated data channel that is part of the data signal.

10. The method of claim 7, wherein the dedicated control channel has a fixed spreading factor.

11. The method of claim 7, including receiving control information over at least one dedicated physical control channel, at least one dedicated physical data channel and a high speed dedicated physical control channel associated with a high speed downlink shared data channel in the downlink direction, and including multiplexing the channels by allocating the channels between an I and a Q channel such that a load on the I channel is approximately balanced with a load on the Q channel.

12. The method of claim 7, wherein the control information received over the high speed dedicated control channel includes at least a pilot reference, hybrid automatic repeat request information, and mobile device buffer backlog information.

* * * * *